United States Patent [19]

Bischel et al.

[11] Patent Number: 5,504,763
[45] Date of Patent: Apr. 2, 1996

[54] SYSTEM FOR MINIMIZING THE DEPOLARIZATION OF A LASER BEAM DUE TO THERMALLY INDUCED BIREFRINGENCE

[75] Inventors: William K. Bischel, Menlo Park; Murray K. Reed, Palo Alto; Daniel K. Negus, La Honda; George Frangineas, Hayward, all of Calif.

[73] Assignee: Coherent, Inc., Santa Clara, Calif.

[21] Appl. No.: 498,143

[22] Filed: Jul. 19, 1995

Related U.S. Application Data

[63] Continuation of Ser. No. 196,411, Feb. 15, 1994, abandoned.

[51] Int. Cl.$^6$ .................................................. H01S 3/00
[52] U.S. Cl. ............................. 372/33; 372/108; 372/9; 372/27
[58] Field of Search .......................... 372/9, 29, 27, 372/21, 99, 108; 378/98, 19, 20, 33

[56] References Cited

U.S. PATENT DOCUMENTS

| | | | |
|---|---|---|---|
| 4,321,550 | 3/1982 | Evtuhov | 372/9 |
| 4,493,086 | 1/1985 | Jain et al. | 372/21 |
| 4,500,855 | 2/1985 | Feinberg | 372/21 |
| 4,573,157 | 2/1986 | O'Meara | 372/19 |
| 4,709,368 | 11/1987 | Fukuda et al. | 372/9 |
| 4,734,911 | 3/1988 | Bruesselbach | 372/29 |
| 4,949,358 | 8/1990 | Kantorski et al. | 372/94 |
| 5,022,033 | 6/1991 | Hackell | 372/25 |
| 5,052,815 | 10/1991 | Nightingale et al. | 372/94 |
| 5,148,445 | 9/1992 | Liu et al. | 372/97 |
| 5,199,042 | 3/1993 | Papetti et al. | 372/95 |
| 5,222,094 | 6/1993 | Hanna et al. | 372/94 |

FOREIGN PATENT DOCUMENTS

| | | | |
|---|---|---|---|
| 0383638 | 8/1990 | European Pat. Off. | H01S 3/23 |
| WO86/03066 | 5/1986 | WIPO | H01S 3/08 |
| aaa7/05751 | 9/1987 | WIPO | H01S 3/10 |

OTHER PUBLICATIONS

N. F. Andreev, S. V. Kuznetsov, O. V. Palashov, G. A. Pasmanik & E. A. Khazanov, "Four-pass YAG:Nd laser amplifier with compensation for aberration and polarization distortions of the wavefront," *Sov. J. Quantum Electron,* 22(9), Sep. 1992, pp. 800–802.

W. Koechner, D. L. MacAdam, *Solid–State Laser Engineering*, Springer–Verlag, New York, (1976), pp. 200 and 355–365.

(List continued on next page.)

*Primary Examiner*—Leon Scott, Jr.
*Attorney, Agent, or Firm*—Limbach & Limbach; Michael A. Stallman

[57] ABSTRACT

A system is disclosed for minimizing the depolarization of a laser beam due to thermally induced birefringence in a rod-shaped gain medium over a wide range of excitation levels. After passing through the gain medium, the polarization of the beam is rotated by ninety degrees and either redirected back into the same gain medium or a substantially identical gain medium. By this arrangement, the portion of the beam that was radially polarized during the first pass is tangentially polarized during the second pass so that the original polarization is restored. In order to maximize the compensation, a relay image system is used to generate an image of the beam in the gain medium as it existed during the first pass and project that image into the gain medium during the second pass. The magnification of the relayed image is substantially one to one with respect to the actual image. By using a relayed image with a unity magnification, the size of the beam and the angle and the position of the rays in the beam are preserved at varying thermal loads. In this manner, maximum coincidence of the rays during the two passes is achieved. In the case of asymmetric pumping, performance can be enhanced by inverting the image of the beam prior to the second pass through the gain medium. The subject system is particularly useful for maximizing the fidelity of a phase conjugate reflector used in a solid state amplifier.

8 Claims, 5 Drawing Sheets

OTHER PUBLICATIONS

I. D. Carr & D. C. Hanna, "Performance of a Nd:YAG Oscillator/Amplifier with Phase–Conjugation via Stimulated Brillouin Scattering," *Applied Physics B,* (Jan. 1985), vol. 36, pp. 83–92.

J. T. Hunt, J. A. Glaze, W. W. Simmons & P. A. Renard, "Suppression of self–focusing through low–pass spatial filtering and relay imaging," *Applied Optics,* Jul. 1, 1978, vol. 17, No. 13, pp. 2053–2057.

D. M. Pepper, D. A. Rockwell & H. W. Bruesselbach, "Phase Conjugation: Reversing Laser Aberrations," *Photonics Spectra,* (Aug. 1986), pp. 95–96, 98, 100–102 & 104.

D. A. Rockwell, H. W. Bruesselbach, "Applications of phase conjugation to advanced solid–state lasers," Abstract, Monday 9 Jun. (Jun. 9, 1986), pp. 38–39.

H. W. Bruesselbach & D. A. Rockwell, "Spectral characterization of a self–Q–switched phase–conjugate Nd:YAG oscillator," Abstract, Monday 9 Jun. (Jun. 9, 1986), pp. 38–39.

W. C. Scott & M. de Wit, "Birefringence Compensation of $TEM_{00}$ Mode Enhancement in a Nd:YAG Laser," *Applied Physics Letters,* 1 Jan. 1971, vol. 18, No. 1, pp. 3–4.

M. K. Reed & W. K. Bischel, "Acousto–optic modulators as unidirectional devices in ring lasers," *Optics Letters,* May 1, 1992, vol. 17, No. 9, pp. 691–693.

L. J. Bromley & D. C. Hanna, "Single–frequency Q–switched operation of a diode–laser–pumped Nd:YAG ring laser using an acousto–optic modulator," *Optics Letters,* Mar. 15, 1991, vol. 16, No. 6, pp. 378–380.

I. D. Carr, D. C. Hanna & K. H. Wong, "Stabilisation of Single–Longitudinal Mode Operation in a Q–Switched Nd:YAG Laser," *Optics Communications,* 1 Sep. 1985, vol. 55, No. 3, pp. 179–184.

J. Richards, "Birefringence compensation in polarization coupled lasers," *Applied Optics,* (Jul. 1, 1987), vol. 26, No. 13, pp. 2514–2517.

I. D. Carr & D. C. Hanna, "Performance of a Nd:YAG Oscillator/Amplifier with Phase–Conjugation via Stimulated Brillouin Scattering," *Applied Physics B,* (Jan. 1985) vol. 36, pp. 83–92.

D. M. Pepper, D. A. Rockwell & H. W. Bruesselbach, "Phase Conjugation: Reversing Laser Aberrations," *Photonics Spectra,* (Aug. 1986), pp. 95–96, 98, 100–102, & 104.

SYSTEM FOR MINIMIZING THE DEPOLARIZATION OF A LASER BEAM DUE TO THERMALLY INDUCED BIREFRINGENCE

This is a continuation of application Ser. No. 08/196,411, filed on Feb. 15, 1994, now abandoned.

TECHNICAL FIELD

The subject invention relates to a system for minimizing the depolarization of a laser beam due to thermally induced birefringence in a rod-shaped gain medium. The system is particularly useful for improving the performance of a high power, high repetition rate, solid state, phase conjugate amplifier.

BACKGROUND OF THE INVENTION

There has been significant interest in developing high power, high repetition rate, solid state, pulsed laser amplifiers. In these systems, a small master laser oscillator is used to generate low power pulses. Preferably, the pulses have a single longitudinal and transverse mode. The pulses are directed into an amplifier cell which includes a solid state gain medium such as a Nd:YAG rod. The solid state gain medium is typically excited by a flashlamp but recently diode lasers have been used as the excitation source. The pulses from the master laser are amplified by the energy stored in the gain medium.

One problem which has limited the development of higher power amplifiers is that the excitation of the gain medium generates a significant amount of heat which increases the temperature of the rod. The laser rod is typically cooled from the outside leading to radial temperature gradients within the rod. As the pump power is increased, nonuniform temperature distributions can create thermally induced stresses which distort the wavefront of the beam and degrade the performance of the laser.

Various approaches have been proposed to remove or compensate for these wavefront distortions. One of the more promising approaches is described in U.S. Pat. No. 4,734,911, issued Mar. 29, 1988, to Bruesselbach and also described in a related article "Phase Conjugation: Reversing Laser Aberrations," Photonics Spectra, page 95, August 1986. In this approach, the properties of a phase conjugate mirror are used to reverse the wavefront of a beam so that when it is sent back into the gain medium, the distortions can be compensated. (See also, "Performance of a Nd:YAG Oscillator/Amplifier with Phase-Conjugation via Stimulated Brillouin Scattering," Carr and Hanna, *Applied Physics B*, 36,83–92 (1985)).

FIG. 1 illustrates a simplified schematic layout of a prior art solid state amplifier 10 using a phase conjugate mirror of the type described in the above cited references. As illustrated in FIG. 1, low power pulses are generated by a small master oscillator 12. The output pulses are coupled into the amplifier gain medium 14. The gain medium is excited by a flashlamp 16. As noted above, the thermal loading of the gain medium will create phase front distortions in the beam.

If the distorted wave were reflected back into the gain medium using a conventional reflector, the phase front distortions would be further increased by the thermally induced stresses in the crystal. In contrast, if the wavefront is reflected by a phase conjugate mirror 18 (PCM), the distortions are reversed. By passing the reversed distortions back through the gain medium, the distortions can compensated. A quarter-wave plate 20 can be located between the mirror 18 and the medium 14 to rotate the polarization of the beam so that it may be coupled out of the amplifier using a polarizing splitter 22.

There are various types of phase conjugate mirrors which can be used in the layout illustrated in FIG. 1. The above cited Bruesselbach patent suggests using a stimulated scattering type medium such as stimulated Brillouin scattering (SBS) or stimulated Raman scattering (SRS). A sealed transparent tube filled with Freon defines a common SBS element.

The approach described by Bruesselbach appears to have been satisfactory for moderate repetition rates and therefore moderate thermal loading of the amplified gain medium. More specifically, Bruesselbach indicates that his system was operational up to about 10 Hz. It would be desirable to operate a system at a repetition rate of 100 Hz or higher. When the repetition rate is increased to this level, the amount of pump power which is coupled into the gain medium is significantly greater. In this situation, the thermally induced stresses create significant birefringence which induces strong depolarization effects in the beam. In fact, depolarization ratios of greater than fifty percent can be expected with flashlamp powers in the kilowatt regime. The depolarization ratio is defined as the energy in the unwanted (orthogonal) polarization divided by the total energy in the beam.

Unfortunately, the ability of the phase conjugate mirror to reverse the phase front of a beam (defined as the fidelity of the phase conjugate mirror) is dependent on the polarization purity of the incoming beam. Thus, if the beam is depolarized to any great extent, a true phase front reversal will not be achieved by a simple phase conjugate mirror based on an SBS cell. If the distorted phase front returning into the gain medium is not the same as that emerging from it, then the distortions will not be fully compensated resulting in degraded performance of the system.

Accordingly, it is an object of the subject invention to provide an approach for minimizing the depolarizing effects created by thermally induced stress birefringence.

It is another object of the subject invention to create a system where the depolarization effects are minimized so that the phase front distortions can be compensated.

It is a further object of the subject invention to provide an amplifier system where the depolarizing effects of the gain medium are minimized.

It is still another object of the subject invention to provide an solid state laser amplifier which can operate at a repetition rate of greater than 100 Hz without degraded performance.

It is still a further object of the subject invention to provide a solid state laser amplifier which can efficiently operated over a full range of repetition rates and thermal loading without significant adjustment.

SUMMARY OF THE INVENTION

In accordance with these and other objects, the subject invention provides for a scheme for minimizing the depolarizing effects created by thermally induced birefringence. The approach is particularly useful in an amplifier system which includes a phase conjugate mirror that requires a highly polarized beam for maximum fidelity.

In accordance with the subject invention, a relay image means is used to transfer an image of the beam within a rod-shaped gain medium back into the same or a substantially identical gain medium. The relay image means is arranged to maintain the angle and position of the rays in the beam. In addition, the overall magnification of the relay image means is arranged to be one to one, so that the size of the relayed image will be the same as the original image. Prior to being reimaged, the polarization of the beam is rotated by ninety degrees. By this arrangement, the part of the mode of the beam that was radially polarized during the first pass is tangentially polarized during the second pass such that the initial polarization state can be substantially restored.

The concept of compensating for thermal birefringence by passing the beam through a rod a second time after a ninety degree polarization rotation is known. For example, see W. C. Scott, "Birefringence Compensation and $TEM_{oo}$ Mode Enhancement in a Nd:YAG Laser," *Applied Physics Letters*, Vol. 18, No. 1, pp.3–4 (1971); W. Koechner, *Solid State Laser Engineering*, Springer-Verlag, New York, 1976, pages 200 and 355 to 365, and U.S. Pat. No. 4,949,358, issued Aug. 14, 1990 to Kantorski, and assigned to the same assignee as the subject invention. However, none of these prior art references disclose the concept of using a relay image means for imaging the beam with unity magnification to maximize the mapping of the beam back into the gain medium thereby maximizing compensation.

In a further aspect of the subject invention, the image is also inverted before the second pass through the gain medium. By this arrangement, the effects of a spatially nonuniform gain distribution, which can arise, for example, when the rod is pumped from one side, can be compensated.

In the amplifier system of the subject invention, after the polarization of the beam has been compensated using the relay image technique, the beam is then directed to a phase conjugate reflector. The phase conjugate reflector functions to reverse the phase of the beam. Since the depolarization of the beam has been minimized, the fidelity of the phase conjugate reflector is high and the quality of the phase reversal of the distortions are good. When the beam passes through the amplifier cell a second time, the phase distortions can be substantially removed and the performance of the system can be improved.

Experiments have shown that the depolarization effects described herein could be compensated at low to middle range repetition rates and moderate thermal loading by using a fixed negative lens or a non-imaging telescope instead of a relay image system. However, compensation using these prior approaches will only be effective over a narrow range of thermal loading and cannot demonstrate repetition rate agility. In contrast, the relay image system described herein allows for operation over the full range of repetition rates and power loading.

Further objects and advantages of the subject invention will become apparent from the following detailed description taken in conjunction with the drawings in which:

DETAILED DESCRIPTION OF THE PREFERRED EMBODIMENTS

Figure 1:
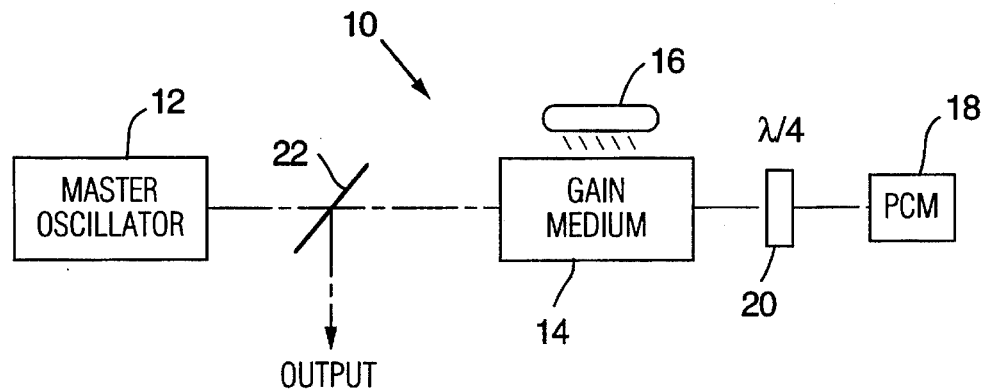
FIG. 1 is a schematic diagram of a phase conjugate amplifier found in the prior art.
Figure 2:
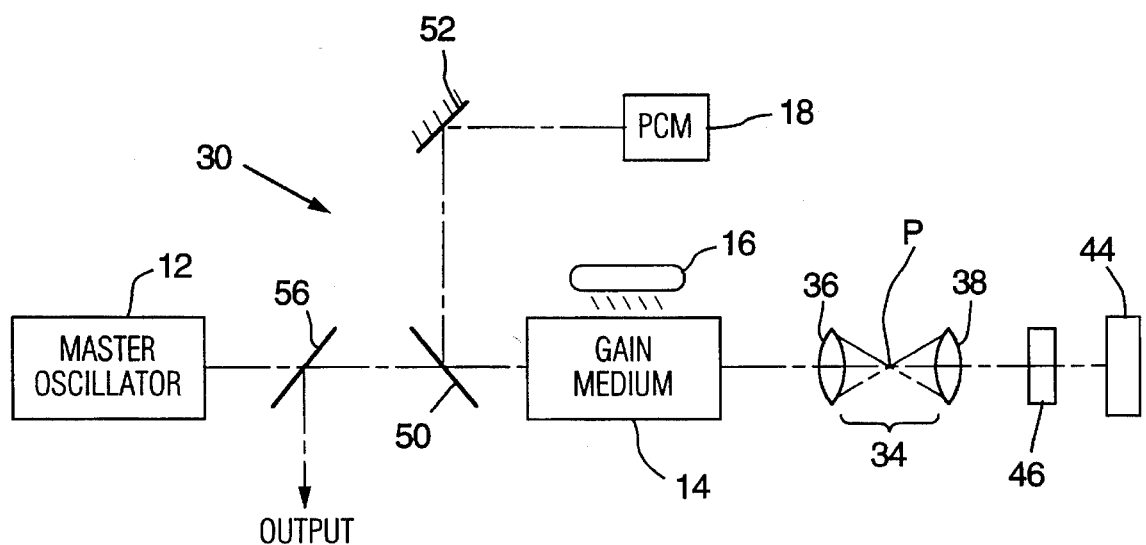
FIG. 2 is a schematic diagram of a phase conjugate amplifier which utilizes the polarization compensation scheme of the subject invention.

Turning to FIG. 2, there is illustrated a simplified schematic diagram of a phase conjugate laser amplifier 30 utilizing the polarization scheme proposed herein. As in the FIG. 1 embodiment, the output pulses from a master oscillator 12 are coupled into a rod-shaped amplifier gain medium 14. Because of the heat generated in the rod by the flashlamp 16, thermally induced stresses will create birefringence which will depolarize the input laser beam.

In accordance with the subject invention, the depolarization effects of the thermal birefringence are minimized by using a relay image means or telescope 34 to generate a real image of the beam which is then directed back into the gain medium. More specifically, the optical properties of the image means are chosen so that a real image of the beam is reproduced in size, angle and position and will pass through the gain medium a second time. The relay image system 34 is chosen because it can achieve this result independent of the extent of focusing caused by the varying thermal lens in the gain medium.

The concept of relay imaging has been used in the art for other purposes. See for example, "Suppression of Self-Focusing through Low-Pass Spatial Filtering and Relay Imaging," Hunt et. al, *Applied Optics*, Vol 17, No. 13, page 2053, Jul. 1, 1978. A relay image can be created with various multiple optical lens elements or mirrors having different magnifications and spacings. For purposes of this specification, the term relay lens system is intended to include any known optical elements suitable for focusing light. The simplest layout as shown in FIG. 2 includes two identical lenses 36 and 38. Assuming these lenses each have a focal length F, then they would be spaced apart a distance of 2 F. In addition, the distance D between the image in the gain medium 14 (object plane) and the reflector 44 (image plane) would be equal to 4 F to generate a magnification of one to one. Thus, the most basic equation for the positioning of the relay lenses would be:

D=4 F (1)

The lens pair would not have to be centered between the gain medium and the reflector 44.

The beam is focused at a point P between the lenses 36 and 38. Further, an intermediate image of the beam as it exists at the longitudinal center of the gain medium 14 is created at the reflector 44. The magnification of this intermediate image does not have to be one to one. This intermediate image is then redirected back through the relay lens assembly 34 and recreated back in the gain medium 14. At this point, the size of the relayed image must be the same size as the original image. As noted above, the rays in this image plane are identical in both angle and position to the rays traversing the medium during the first pass through the medium.

Compensation of the depolarization is achieved by rotating the polarization of the beam by ninety degrees prior to the beam reentering the gain medium. There are a number of optical elements which could be used to create this polarization rotation. In the layout shown in FIG. 2, a Faraday rotator 46 is utilized. The Faraday rotator 46 functions to rotate the polarization of the beam by 45 degrees on the first pass therethrough. Rotator 46 will rotate the beam an additional 45 degrees on the return pass.

As noted above, by rotating the polarization by ninety degrees, the components of the beam which were radially polarized during the first pass through the rod will be tangentially polarized during the second pass. By using the relay image system, the coincidence of the rays going in both directions is maximized so that maximum compensation can be achieved. As noted above, this result can be achieved at varying thermal loads which create different thermal lens effects in the medium.

Once the beam has passed through the gain medium a second time, it is directed by polarizer 50 and turning mirror 52 into the phase conjugate reflector 18. Reflector 18 functions in the manner described above and reverses the phase front of the beam, including the distortions created in the gain medium. In this layout, since the polarization of the beam has been substantially preserved, the polarizer serves as an effective coupler into the phase conjugate leg of the system. Additionally, the high polarization purity ensures that the fidelity of the reflector 18 will remain high so that when the beam is returned to the gain medium, the phase front distortions can be highly corrected. In this layout, the beam will then pass through the gain medium 14 two more times. Because the polarization of the beam will be rotated a second time by the Faraday rotator 46, it will pass through polarizer 50 and be reflected out of the amplifier by polarizer 56.

It is believed that the subject polarization compensation system can be used in any situation where there is a rod-shaped optical element that is either naturally nonbirefringent or oriented to be nonbirefringent, but which will exhibit stress birefringence when placed under thermal loads. It is believed that the subject invention is particularly suited for polarization compensation in gain media such as Nd:YAG, Nd:YSGG and Nd:glass or any other rare earth doped YAG or glass. As will be discussed below, the subject compensation scheme utilizing a relay image system can also be implemented by passing the beam through two different, but substantially identical rods, in a manner analogous to the prior art stress birefringence compensation schemes.

Figure 3:
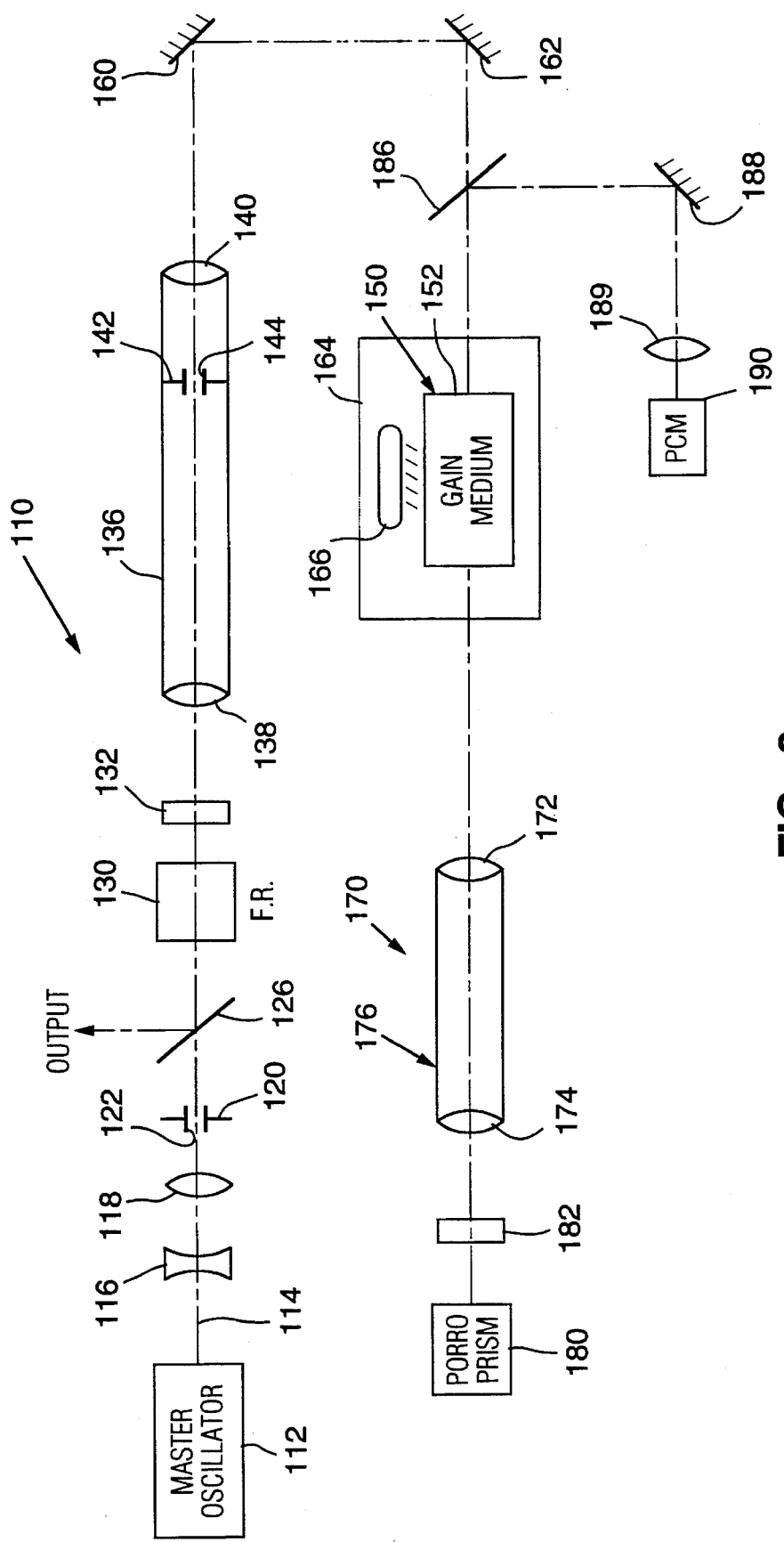
FIG. 3 is a schematic diagram of a preferred embodiment of a four pass phase conjugate amplifier which utilizes the compensation scheme of the subject invention.
Figure 4:
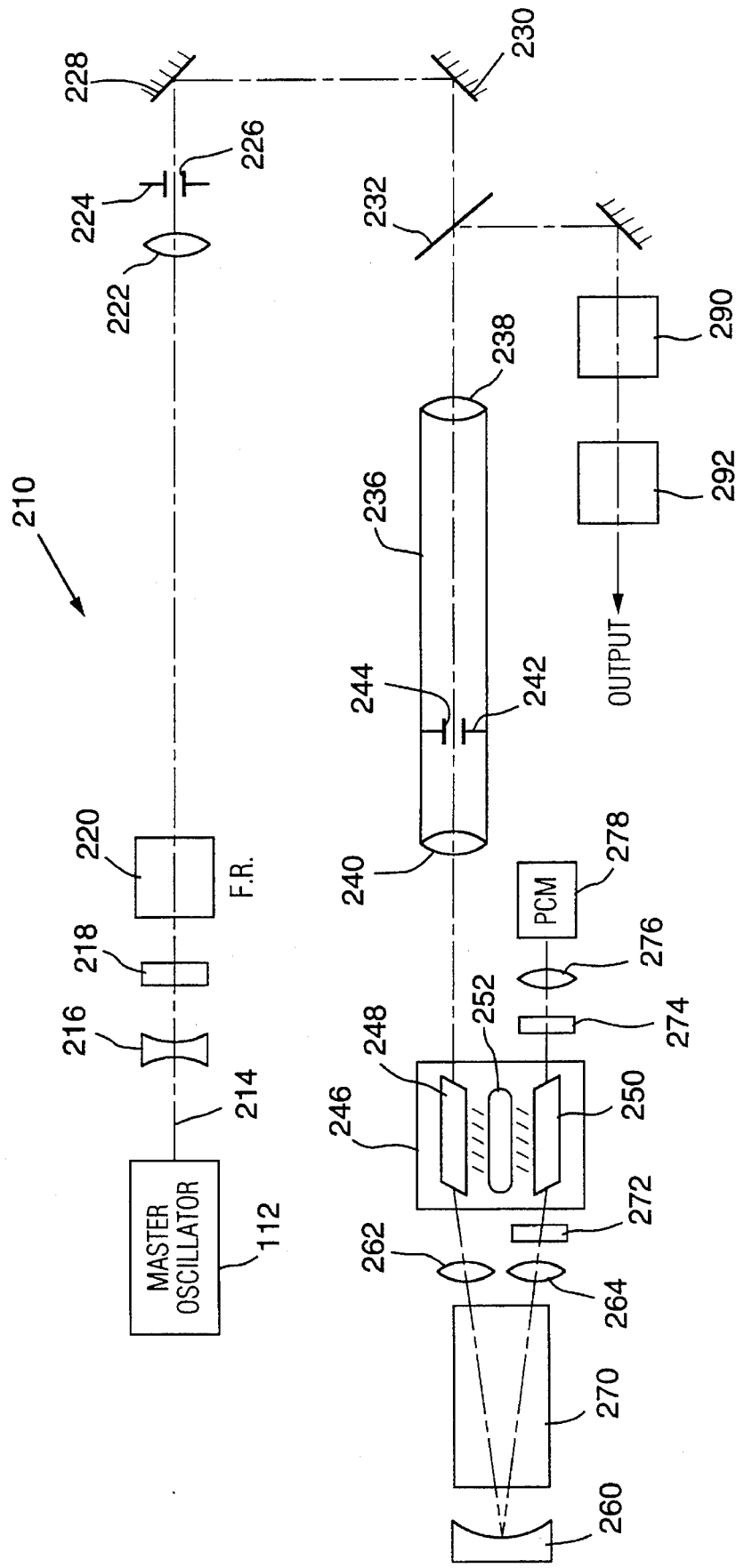
FIG. 4 is a schematic diagram of a preferred embodiment of a two pass phase conjugate amplifier which utilizes the compensation scheme of the subject invention.

FIGS. 3 and 4 are schematic diagrams illustrating two alternate phase conjugate amplifier designs which employ the depolarization scheme of the subject invention. FIG. 3 illustrates a four pass configuration similar to FIG. 2. FIG. 4 illustrates a two pass configuration, where two separate solid state rods are used, and one rod is used to compensate for the depolarization effects caused by the other rod.

Turning first to the amplifier 110 illustrated in FIG. 3, the master oscillator 112 is defined by a diode pumped solid state laser. In the preferred embodiment, the resonator of the oscillator is in the form of a ring. The ring is defined by two end mirrors and by providing two angled reflecting surfaces on the ends of the gain medium, in this case, Nd:YAG. This configuration is defined in greater detail in U.S. Pat. No. 5,052,815, issued Oct. 1, 1991, assigned to the same assignee as the subject invention and incorporated herein by reference. An acousto-optic modulator is used to create Q-switched pulses. The AO modulator also provides preferential losses in one direction and acts as an optical diode causing the oscillator 112 to operate unidirectionally. Single frequency operation is achieved through the ring geometry and by operating the oscillator slightly above threshold (prelasing) before opening the Q-switch. The latter prelase feature functions to seed the Q-switch pulse with a low power, single frequency beam. This approach for generating single frequency operation is described in "Single Frequency Q-switched Operation of a Diode-Laser Pumped Nd:YAG Ring Laser Using an Acousto-Optic Modulator," Bromley and Hanna, *Optics Letters*, 16, pages 378–380, 1991. The theory for unidirectional operation is described by Reed and Bischel in "Acousto-optics modulators as unidirectional devices in ring lasers," *Optics Letters*, 17, pages 691–693, 1992.

The small ring geometry allows the oscillator to generate Q-switched output pulses that are about 10 nanoseconds long. The pulses have an energy of 25 microjoules at a wavelength of 1.06 microns. The output beam 114 is linearly polarized in the horizontal plane and is Gaussian in shape with a beam diameter of approximately 0.1 mm.

The output beam 114 is expanded from a beam diameter of 0.1 mm using lenses 116 and 118. The beam is then passed through plate 120 having an 8 mm aperture 122 to clip the beam at the $1/e^2$ diameter. The 8 mm diameter beam is then passed through a polarizing beam splitter 126 and into a Faraday rotator 130 which rotates the polarization state of the beam by 45 degrees. The combination of Faraday rotator 130 and polarizer 126 act as an optical isolator to prevent reflected light from reentering the oscillator 112 and disturbing the single frequency operation, and to provide a means of coupling the returning amplified beam out of the laser amplifier chain as described below. The forward traveling beam then passes through half-wave plate 132 to rotate the polarization state back to the horizontal plane.

The beam then passes through a vacuum spatial filter assembly 136 that consists of lenses 138 and 140 (focal lengths of 14.5 cm and 10 cm, respectively) and plate 142 with an aperture 144 (diameter of approximately 380–400 microns). The spatial filter 136 performs a number of functions. First, the filter functions to reduce the diameter of the beam from 8 mm down to 5.5 mm. The upstream 8 mm diameter beam is desireable to minimize damage to the optical components such as the Faraday rotator. The smaller downstream 5.5 mm diameter allows the beam to be coupled into the 6.35 mm (¼ inch) aperture of the Nd:YAG rod 150 without clipping. The spatial filter 136 also functions to relay an image of the aperture 122 onto the front surface 152 of Nd:YAG rod 150 to provide a beam profile that is as close to a "top hat" as possible for the amplification process. In addition, the spatial filter 136 protects the high gain amplifier from optical damage that would result from spurious near or on axis retroreflections of the output beam. The spatial filter also removes the hard edges on the beam imposed by aperture 122 thereby reducing the possibility of optical damage to components in the high gain amplifier. Finally, the spatial filter eliminates diffraction rings from the near field beam profile of the output beam that would be present due to the slight clipping on apertures within the optical beam path of the amplifier.

After exiting the spatial filter, beam 114 is turned by mirrors 160 and 162 and directed into the amplifier cell 164. Cell 164 includes a Nd:YAG rod 150 which is pumped by a single flashlamp 166. Alternately, diode lasers could be used in place of the flashlamp as the optical pump source. For Nd:YAG or similar materials, the flashlamp pulses are 250–300 microseconds long. Once the flashlamp 166 is triggered, the gain in the rod will build up. Single pass gains exceeding 150 have been demonstrated for this amplifier cell. At the end of the flashlamp pulse, the pulse from the master oscillator 112 will be triggered, and the energy stored in the amplifier (up to 500 mJ) can be extracted during the four passes therethrough as discussed below. Because the leading edge of the master oscillator pulse is preferentially amplified and because of the dynamics of the SBS reflectivity, the pulse width is shortened to about 4 nanoseconds.

As mentioned above, it is desirable to operate this laser at repetition rates exceeding 100 Hz. At this level, approximately 4 kilowatts of average power will be dissipated by the flashlamp 166. This amount of power will cause significant thermal stress birefringence in rod 150 which will distort the wavefront and depolarize the beam.

In a manner similar to that shown in FIG. 2, the depolarized beam exiting the rod passes through a relay lens assembly 170. This relay lens assembly includes two identical lenses 172, 174. Typical focal lengths for these lenses are 15 cm spaced by 30 cm. The lenses are sealed to the ends of a cell 176 which is evacuated. Since the beam comes to a focus within the cell, it is desirable to locate the focal point in a vacuum so that the air does not breakdown. The relay lens assembly 170 generates an intermediate image of a plane at the center of the Nd:YAG rod 150 to the plane of a Porro prism 180.

The output of the relay lens assembly is passed through a wave plate 182 and is reflected by the Porro prism 180. Alternately, a mirror and Faraday rotator, which is an equivalent optical arrangement, can be used. The primary function of the Porro prism/wave plate (or Faraday rotator/mirror) is to retro-reflect the beam while rotating the arbitrary polarization state of the beam by 90 degrees. The use of the Porro prism in combination with a waveplate to rotate the polarization state by 90 degrees is a technique known within the art (see J. Richards, "Birefringence compensation in polarization coupled lasers," Applied Optics, Vol. 26, No. 13, pp. 2514–2517, 1987, and references therein). The reflected beam is then relay imaged again by lens assembly 170 from the plane of the Porro prism 180 into the center of rod 150. The ratio of the magnification between the image in the rod on the first pass and the relayed image is one to one. This unity magnification of a relayed image assures maximum coincidence of the first and second pass rays in the rod, which we have discovered to be an important element for obtaining good depolarization compensation.

When the polarization state of the reflected beam is rotated by 90 degrees and passed back through the same (or an equivalently pumped) gain medium without relay imaging, the output beam of the second pass can have a depolarization ratio as small as 15% at the 3.5 kW pump level as demonstrated in our laboratory. However, with the relay imaging technique we have been able to demonstrate a depolarization ratio for the output beam of less than 1.3% at the 3.5 kW pump level, and this depolarization ratio falls to less than 0.4% at 2 kW of average pump power. This order of magnitude improvement in the depolarization ratio is directly attributable to the fact that we have matched the rays of the first and second passes as closely as possible using the relay imaging technique. The fact that the depolarization ratio is of the order of 1% or less is critical for good operation of the phase conjugate laser system.

A secondary function of the Porro prism reflector is to invert the image of the beam between the first and second, and the third and fourth passes through the rod. The use of image inversion provides some additional and surprising results. More specifically, in many amplifier designs, a single flashlamp is located on one side of the gain medium. In this configuration, one side of the gain medium tends to be pumped harder than the other side creating a nonuniform or skewed distribution of intensity in the beam. If the image of the beam is inverted on the second pass through the medium, the part of the beam that was amplified to a lesser extent will pass through the region of higher gain so that the radial intensity of the double passed beam will be more uniform.

While the latter result in and of itself might be predicted, it was not clear that such a geometry could be used in the present arrangement since it is important for the beam to pass through essentially identical regions of the rod so that the depolarization caused by the birefringence on the first pass would be compensated on the second pass. Since it was known that one side of the medium is pumped harder than the other, it did not appear that the thermally induced birefringence would be similar on both sides of the medium. In fact, it now appears that the while there is a clear nonuniformity in the gain distribution for the purposes of transferring energy to the beam, there is nonetheless substantial radial uniformity in the distribution of the thermally induced stress birefringence. It is believed that the radial uniformity of the stress birefringence is due to the fact that the stress birefringence is created over time and is a steady state phenomena that is more dependent on the cooling geometry than the pumping geometry. In contrast, the nonuniform pump energy distribution exists only during the short intervals when the medium is in the excited state. Thus, it is possible to invert the image to insure that the intensity in the beam is more radially uniform while maintaining the desired high level of polarization compensation.

The remainder of the beam path is similar to that shown in FIG. 2. Specifically, the beam 114 is directed by splitter 186 and reflector 188 and focused by a lens 189 into onto a phase conjugate mirror 190 (PCM). Phase conjugate mirror 190 consists of an SBS cell. In the preferred embodiment, the SBS cell is defined by a transparent elongated tube filled with carbon disulfide. As noted above, PCM 190 functions to reverse the wavefront of the beam so that when it passes back into the rod 150, the wavefront distortions will be compensated. The beam will pass back through the rod 150, relay lens assembly 170 and reflect back off prism 180. The fourth pass through the rod will compensate for the depolarization induced by the third pass through the rod. As noted above, the Porro prism will invert the image of the beam so that the radial intensity will be more uniform.

Once the beam has passed through the rod the fourth time, it will be transmitted by polarizer 186, turned by the reflectors 162 and 160 and passed through spatial filter 136, waveplate 132 and Faraday rotator 130. The combination of waveplate 132 and Faraday rotator 130 rotates the polarization by 90 degrees and the beam is coupled out of the 4-pass amplifier beam line by polarizer 126. The combination of polarizer 126, Faraday rotator 130, and waveplate 132 serve as an isolator with an extinction ratio of greater than 1000:1 to minimize feedback into oscillator 112.

With the system described above, we have achieved greater than 40 watts of average power at 100 Hz repetition rate in a near diffraction-limited flat-topped beam profile. Although detailed measurements of the laser linewidth have not been performed, we believe that the linewidth was transformed-limited. Using Freon 113 as an SBS medium, a pulse length of approximately 3–4 nanoseconds FWHM that had a sharp leading edge with a rise-time of approximately 500 picoseconds was observed. The system depolarization was less than 1% for the required 2.8 kW of average power loading to the flashlamp. Average power operation was limited by optical coating damage on the surfaces of the Faraday rotator 130.

The configuration shown in FIG. 3 is optimal for maximizing the repetition rate of the system, while maintaining a pulse energy of less than 400 mJ in a 8 mm beam diameter. If higher energy per pulse is desired, the system 210 shown in FIG. 4, which utilizes two separate rods, is preferred.

Turning to FIG. 4, a master oscillator 112 is provided to generate a pulsed output beam 214. Beam 214 is passed through lens 216, half wave plate 218 and Faraday rotator 220. The beam is then passed through lens 222 and plate 224 having an aperture 226. As in the FIG. 3 embodiment, lenses 216, 222 and aperture 226 function in combination to expand the beam diameter and then clip the beam at the $1/e^2$ diameter. The half wave plate 218 and Faraday rotator 220 function as an optical isolator in a manner similar to the embodiment illustrated in FIG. 3.

The beam is then turned by reflectors 228 and 230 and passed through a polarizer 232 and into a vacuum spatial filter assembly 236. As in the FIG. 3 embodiment, the spatial filter assembly includes a pair of lenses 238 and 240 and an internal plate 242 with an aperture 244. The spatial filter serves the same functions as described above.

In the FIG. 4 embodiment, the amplifier head 246 includes a pair of laser rods, 248 and 250. Both rods are excited by the same flashlamp 252. The end surfaces of each rod 248 and 250 are wedged at an angle of approximately 2.3 degrees. The rods are mounted in cell 246 such that the wedges are opposing and the plane of incidence is in the horizontal plane. If a ray is drawn through the centers of each rod propagating toward reflector 260, it will be refracted at the rod surface and intersect at a point approximately 25 cm from cell 246. The intersection point forms the location for reflector 260.

The rods 248 and 250 should be roughly identical to insure proper depolarization compensation as described previously for the single rod case. It is believed that this requirement is limited to insuring that the rods have substantially the same dimensions and substantially the same dopant concentrations. It does not appear necessary to go to any greater lengths to insure conformity such as picking two rods from the same region of the same crystal boule or even selecting rods from the same boule.

After the beam passes out of the first rod 248 it is directed back into the second rod 250 by the curved reflector 260. Lens pair 262 and 264, and curved reflector 260 define the relay imaging assembly of this embodiment. As in the previous embodiment, the relay lens assembly or telescope functions to create an image in rod 250 of the beam as it exists in the longitudinal center of rod 248. The plane at the center of rod 248 is magnified by lens 262 to create an intermediate image on reflector 260. The plane at reflector 260 is then reimaged (and demagnified to precisely the original size) into the plane at the center of rod 250 using lens 264 and reflector 260. Typical focal lengths for lenses 262 and 264 are 7 cm, and a typical radius of curvature for mirror 260 is 10 cm. The spacing between lenses and mirror is approximately 17 cm. The spacing is configured to give the beam a radius of curvature of approximately 1 meter (expanding) as it enters rod 250 for the conditions of unpumped rods. This allows the thermal lensing of the rods under pumped conditions to be partially compensated.

This relay imaging assembly causes the beam to come to a focus twice between rods 248 and 250. These two foci are located within vacuum cell 270 to prevent air breakdown. This relay imaging assembly also creates an image inversion with the resultant smoothing of the spatial gain profile as described with relation to the Porro prism shown in FIG. 3. Prior to entering the rod 250, the polarization state of the beam is rotated by 90 degrees using optical rotator 272. Assuming the rods are substantially identical as defined above, the depolarization of the beam induced by rod 248 will be compensated by the passage of the beam through rod 250. For this configuration, we have demonstrated a depolarization ratio at the exit of rod 250 of less than 0.4% for 4.0 kW of power to the lamp. At this pump power, the depolarization of a single rod would exceed 50% without the subject relay imaging technique.

The beam passing out of rod 250 is passed through quarter wave plate 274 and then focused by lens 276 into phase conjugate reflector 278. PCM 278 can be formed from carbon disulfide as noted above. In the layout of FIG. 4, the depolarization compensation is so complete that the quarter wave plate 276 can be used to rotate the polarization state by 90 degrees for the second pass through the amplifier system and to allow polarizer 232 to couple the beam out of the returning beam path.

As in the previous embodiments, phase conjugate reflector 278 reverses the wavefront of the beam. The beam is then returned to the amplifier cell 246 where it passes through rod 250, rotator 272 and relay lenses 264 and 262. The beam is then passed through rod 248 where the depolarization of the beam induced by the passage through rod 250 is compensated.

The beam is then directed to polarizer 232 where it is reflected out of the amplifier. The amplified output pulses can be used directly or passed through various non-linear elements such as a doubler 290 or tripler 292.

Figure 5:
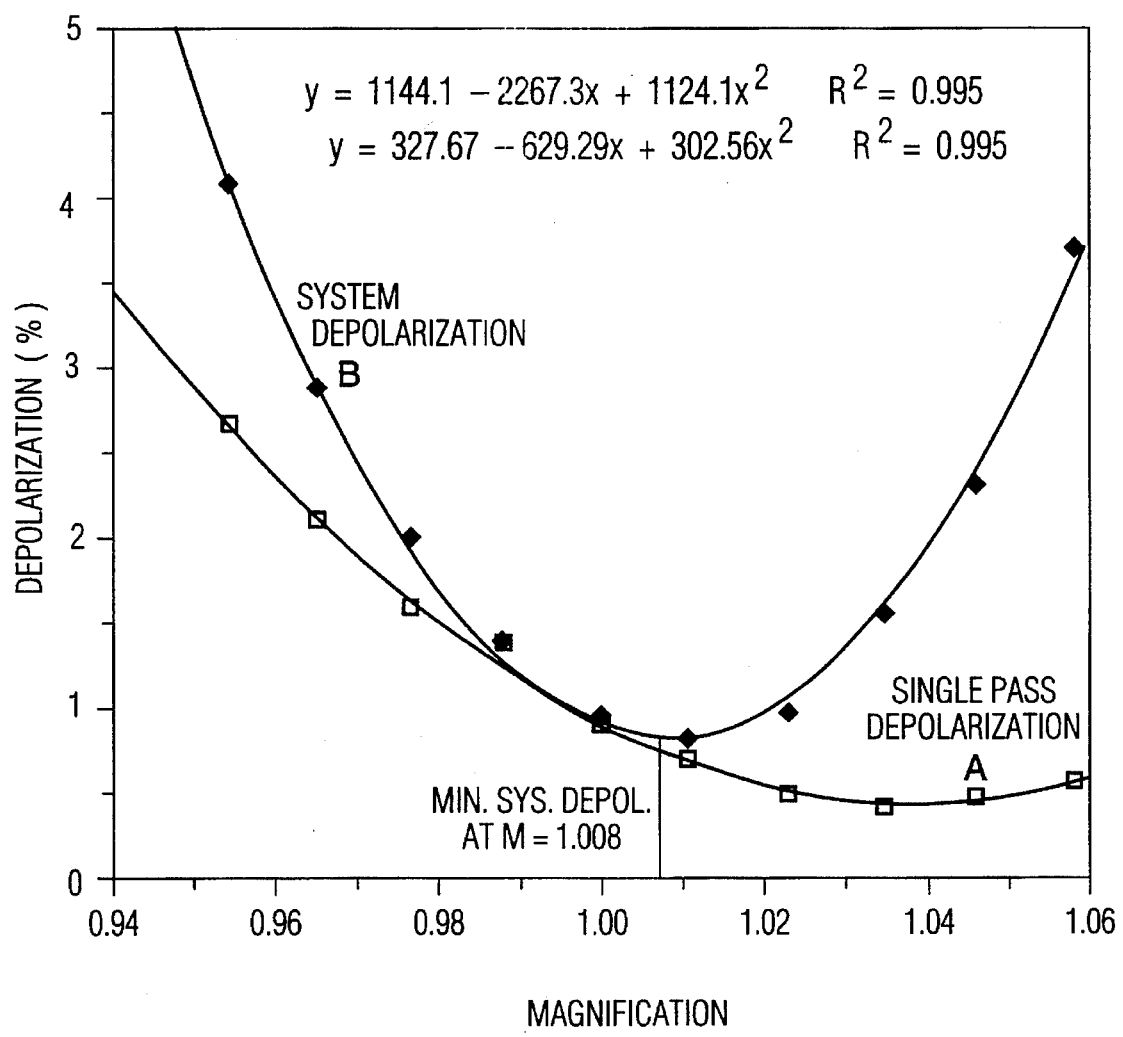
FIG. 5 is a graph illustrating the variation in depolarization which occurs as the magnification of a relay image system is varied for the amplifier illustrated in FIG. 4.

As noted above, it is important that the relay image system be designed to have a magnification of one to one, so that the size of the relayed image is the same as the size of the beam in the rod on the initial pass. FIG. 5 illustrates how dramatically the depolarization level can increase if this relationship is not observed. This data was taken from an amplifier having a configuration illustrated in FIG. 4.

FIG. 5 is a graph wherein the horizontal axis corresponds to the level of magnification (with 1.00 representing one to one). The vertical axis corresponds to the percentage of depolarization which will occur as the magnification is varied. Curve A is a measure of the depolarization after a single pass through the gain medium. Curve B represents the more significant parameter of the system depolarization that occurs after two passes through the gain medium.

As can be seen, system depolarization is at a minimum when the magnification is essentially one to one. When the one to one magnification level is varied by only about six percent (e.g. 0.94 to one), system depolarization rises from a minimum of about one percent to four percent. Thus, a change of less than ten percent in magnification can quadruple the depolarization.

It has been found that the most significant factor in minimizing depolarization is this one to one control of the magnification level. If the amplifier were to be operated at a fixed power level, it might be possible to create this one to one magnification without utilizing a relay image system. However, a relay image system is ideal for preserving the desired one to one magnification level over a large dynamic range of input powers.

Figure 6:
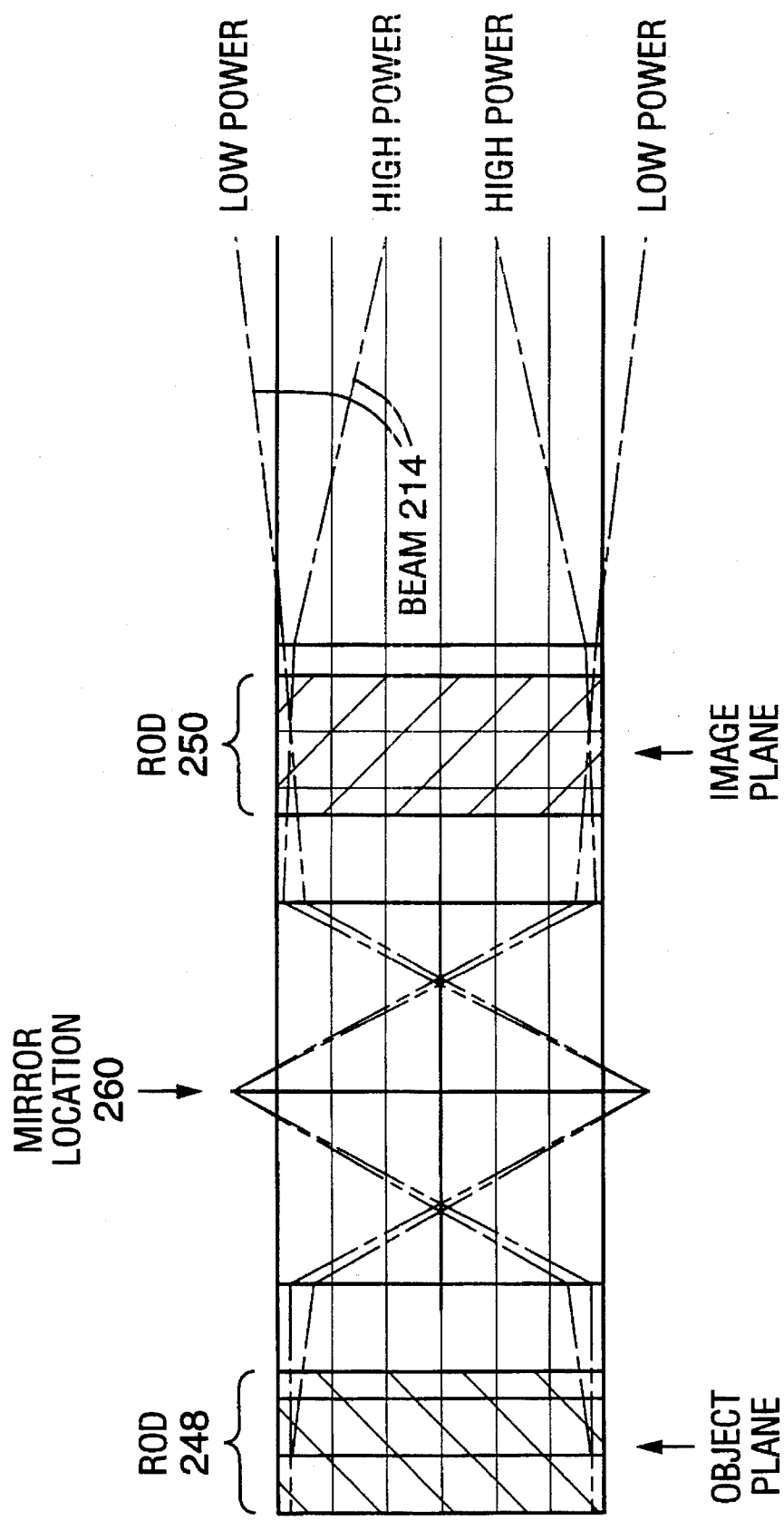
FIG. 6 is a plot of the transverse profile of the beam as it traverses the gain media in the amplifier illustrated in FIG. 4.

There is significant flexibility in designing the elements of the relay image system to achieve this goal. However, to optimize performance, certain criteria should be considered. For example, at low repetition rates and power levels, the positive thermal lens created in the rod will be small. The relay image system should add just enough negative focal power so that none of the beam power is clipped by the aperture of the rod in the low load condition. FIG. 6 is an illustration of the transverse beam profile in the two rods 248 and 250 of FIG. 4 embodiment. As can be seen, at low power loads, beam 214 is expanding rapidly after it exits the rod. In contrast, at maximum power loads, the beam is contracting. However, it should be noted that within the rod, the beam profile is quite similar for either load condition. The fact that the beam divergence is different outside of the rods can be corrected by the phase conjugate reflector.

It has been demonstrated that this design can achieve a depolarization ratio of the amplified output beam of less than 0.5% for an average pump power of the lamp of 4.0 kW at 100 Hz repetition rate. At this pumping level, approximately 45 watts of average power can be extracted from the amplifier. The average power of the laser can be increased to approximately 40 W at 100 Hz by increasing the average power to the lamp. At the present time, the average output power of this system at 100 Hz is limited to approximately 65 watts due to the catastrophic optical damage of the coating on the output surface of rod 248 at higher levels. This optical damage is not observed at repetition rates of 10 Hz, or on lens 240 which experiences the same fluence level. However, improvements in coating technology should remove this limit. The output beam has a near diffraction-limited top hat profile with only very minor diffraction features. This beam profile does not significantly vary with changing repetition rate (average power loading to the lamp). Using carbon disulphide, the temporal pulse width is approximately 5–6 ns FWHM in duration with a smooth profile and a steeper leading edge with a rise time of approximately one nanosecond. We believe the pulse line width to be transform-limited for this pulse shape.

With this embodiment, the maximum single pulse energy extracted from the amplifier system at low repetition rates has been 1 joule for a flashlamp input energy of approximately 55 joules. No adjustment to the optical components is necessary to achieve this result once the system has been optimized at a high repetition rate. All other optical parameters remain substantially the same as those described above.

Although there is flexibility in the selection of the optical elements of the relay image system, the spacing between the optical elements used to create the relay image is critical to minimizing the depolarization of the compensated beam. In the more complex lay-outs illustrated in FIGS. 3 and 4, two different designs have been used to accomplish the relay imaging. In the four-pass amplifier embodiment of FIG. 3, a two lens design is used similar to that illustrated in FIG. 2. However, the intermediate image of the center of the rod 152 at the Porro prism 180 is magnified by approximately a factor of 2 such that the possibility of optical damage to the Porro prism is minimized. (As noted above, the intermediate images can have a magnification larger than one so long as the image is demagnified before it is returned to the rod) The spacing D between the object plane (center of rod) and image plane (position of Porro prism 180) for the general problem of locating an intermediate image that has been magnified by M can be calculated from the equation.

$$D=(M+1)[(M+1)f-(M-1)D_1] \quad (2)$$

where f is the focal length of lens 172, (M×f) is the focal length of lens 174, $D_1$ is the distance from the object plane to lens 172, (M+1)f is the spacing of lenses 172 and 174. Note that if the magnification of the intermediate image is one to one, the location of the intermediate image is the same as described previously in Equation (1). Equation (2) is correct for the location of image planes in air (which has an index of refraction of approximately 1). In the embodiment illustrated in FIG. 3, the calculation is slightly more complicated since the center of the rod 152 is imaged to the Porro prism 180 through approximately 6.4 cm of Nd:YAG crystal that has an index of refraction of approximately 1.72. The exact position of image plane can be easily calculated using an ABCD matrix approach known to those skilled in the art.

The two-pass amplifier embodiment illustrated in FIG. 4 uses a different relay imaging design. In general, an infinite number of lenses or curved mirrors could be used to relay an image over any distance. The two lens, one mirror design in FIG. 4 is equivalent to a three lens design. Equation 3 gives the distance D between the object plane and the image plane for a relay lens assembly containing three lenses, two of which are identical, and unity magnification of the image:

$$D=4f_0+4f_1+(f_1^2/f_0) \quad (3)$$

where $f_1$ is the focal length of the identical lenses (such as 262 and 264 in FIG. 4), $f_0$ is the focal length of the third lens or mirror (e.g., mirror 260 in FIG. 4) that is located between the two identical lenses (lenses 262 and 264) at a distance of $f_1+2f_0$ from each lens. As discussed above, the exact position of the image plane when the object plane is imaged through an optical material (such as the Nd:YAG rod) whose index is different from one can be easily calculated by those skilled in the art. Also, generalizations of Equation 3 for an arbitrary number of lenses or mirrors can be calculated by those skilled in the art.

Careful alignment and positioning of the elements in the relay image assembly is critical to minimize the depolarization ratio. In practice, an iterative alignment procedure is used to minimize the depolarization ratio of the amplifier oscillator beam entering the phase conjugate mirror 278. Referring to FIG. 4, the depolarization ratio is measured after rod 250. A minimum is found as the axial distance from the rod for lens 262 is changed, while iterating the horizontal and vertical position of lens 264. This minimum in the depolarization ratio is typically less than 0.5% for a flashlamp pump power of 3.5 kW at 100 Hz repetition rate. Achieving a depolarization ratio of less than 1% is important to obtain good phase front reconstruction following reflection by the phase conjugate mirror as is observed for the amplifier systems illustrated in FIGS. 3 and 4.

While the subject invention has been described with reference to the preferred embodiments, various changes and modifications could be made therein, by one skilled in the art, without varying from the scope and spirit of the subject invention as defined by the appended claims.

We claim:

1. A system for minimizing depolarization effects on a laser beam caused by thermally induced birefringence in a rod-shaped optical element as the beam passes through the optical element, said beam having a phase and including rays each having an angle and position within the beam, said system comprising:

relay image means for imaging the beam passing through the optical element, said image being directed back into the optical element or into another, substantially identical optical element, while optically maintaining the original phase of the beam and the angle and position of the rays in the beam within the image, and wherein the image generated by the relay image means has a magnification substantially equal to one; and means for rotating the polarization of the beam by ninety degrees before the beam is directed back into the optical element or into said another optical element such that the thermally induced birefringence is compensated and the depolarization of the beam is minimized.

2. A system as recited in claim 1 further including a means for inverting the image before the beam is directed back into the optical element or into said another optical element.

3. A system for minimizing depolarization effects on a laser beam caused by thermally induced birefringence in a rod shaped optical element as the beam passes through the optical element, said beam having a phase and including rays each having an angle and position within the beam, said system comprising:

reflector means disposed so as to reflect the beam passing out of the optical element back into the optical element;

relay image means disposed between the optical element and the reflector means for reimaging the beam back into optical element while optically maintaining the original phase of the beam and the angle and position of the rays in the beam within the image, and wherein the image generated by the relay image means has a magnification substantially equal to one; and rotator means disposed between the reflector means and the optical element for rotating the polarization of the beam by ninety degrees so that the depolarization of the beam generated when the beam passes through the optical element is compensated when the beam is reflected back through the optical element.

4. A system as recited in claim 3 further including a means for inverting the image before the beam is directed back into the optical element.

5. A system for minimizing depolarization effects on a laser beam caused by thermally induced birefringence in first and second substantially identical, rod-shaped optical elements as the beam passes through the optical elements, said beam having a phase and including rays each having an angle and position within the beam, said system comprising:

relay image means located between said optical elements for reimaging the beam passing through the first optical element into the second optical element while optically maintaining the original phase of the beam and the angle and position of the rays in the beam within the image, and wherein the image generated by the relay image means has a magnification substantially equal to one; and rotator means located between the optical elements for rotating the polarization of the beam by ninety degrees so that the depolarization of the beam generated when the beam passes through the first optical element is compensated when the beam passes through the second optical element.

6. A system as recited in claim 5 further including a means for inverting the image before the beam is directed back into the second optical element.

7. A laser amplifier system comprising:

amplifier means including at least one rod-shaped gain medium;

means for exciting the gain medium over a range of excitation parameters, with said excitation also producing a range of thermal birefringence effects in the gain medium;

means for generating a pulsed laser beam, said beam having a phase and a wavefront and further including rays each having an angle and position within the beam;

phase conjugate reflector means for reversing the wavefront of a reflected beam;

means for directing the pulsed laser beam through the amplifier means to amplify the pulses, with the amplified pulses being directed to said phase conjugate reflector, with the phase conjugate reflected pulses being directed back through said gain medium so that the pulses can be further amplified and the birefringence effects can be corrected; and compensation means for minimizing depolarization of the beam created in the amplifier means due to the thermal birefringence effects in the gain medium, said compensation means including a relay image means for imaging the beam passing through the gain medium, said image being directed back into the gain medium or into another, substantially identical gain medium while optically maintaining the original phase of the beam and the angle and position of the rays in the beam within the image, and wherein the image generated by the relay image means has a magnification substantially equal to one, said compensation means further including a means for rotating the polarization of the beam by ninety degrees so that the thermally induced birefringence is compensated and the depolarization of the beam is minimized to maximize the fidelity of the phase conjugate reflector over the range of excitation levels.

8. A system as recited in claim 7 further including a means for inverting the image before the beam is directed back into the gain medium or into said another gain medium.

* * * * *